Figure 1:
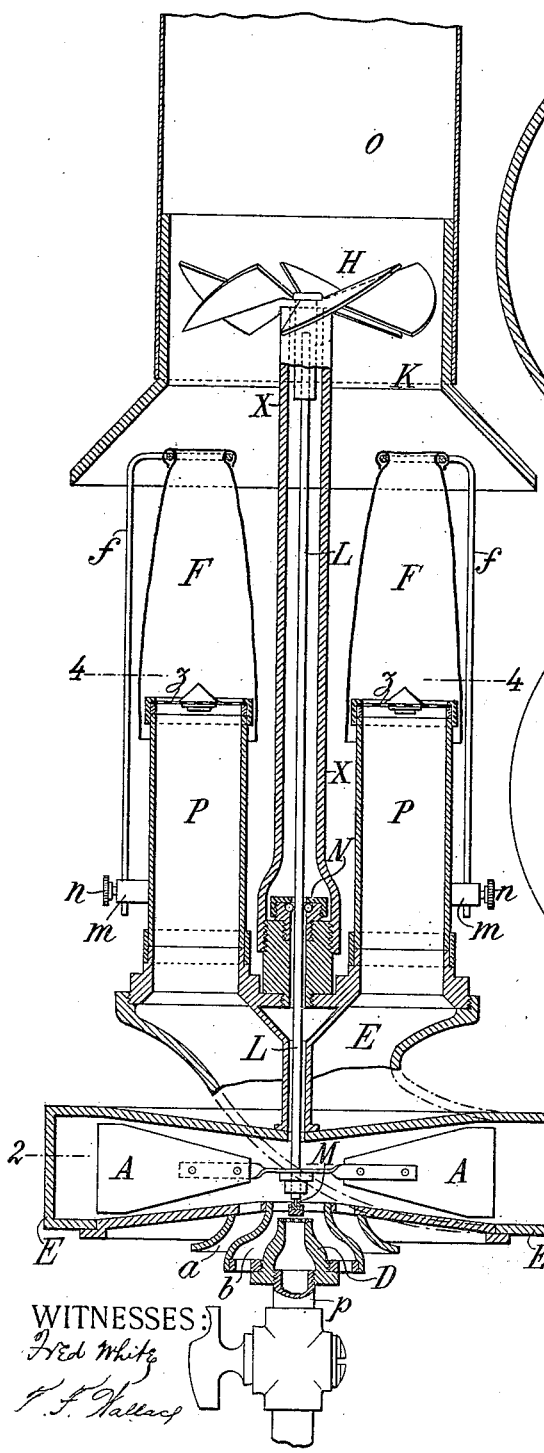

No. 621,962. Patented Mar. 28, 1899.
L. DENAYROUZE.
INCANDESCENT GAS LAMP.
(Application filed Feb. 2, 1897.)
(No Model.) 2 Sheets—Sheet 1.

WITNESSES:
Fred White
J. F. Wallace

INVENTOR:
Louis Denayrouze,
By his Attorneys,
Arthur C. Fraser & Co.

THE NORRIS PETERS CO., PHOTO-LITHO., WASHINGTON, D. C.

UNITED STATES PATENT OFFICE.

LOUIS DENAYROUZE, OF PARIS, FRANCE.

INCANDESCENT GAS-LAMP.

SPECIFICATION forming part of Letters Patent No. 621,962, dated March 28, 1899.

Application filed February 2, 1897. Serial No. 621,726. (No model.)

*To all whom it may concern:*

Be it known that I, LOUIS DENAYROUZE, a citizen of the Republic of France, residing at Paris, France, have invented certain new and useful Improvements in Incandescent Gas-Lamps, (for which I have obtained Letters Patent in Great Britain, No. 7,722, dated April 17, 1895,) of which the following is a specification.

My invention has reference to improvements in incandescent gas-lamps—such, for instance, as the well-known Welsbach lamp—and has for its object to increase the efficiency or power of such lamps by intimately mixing the gas and air and using the potential energy of the gas and of the products of combustion as the sole motive power in effecting the mixture.

By careful photometric tests I have found that the photometric results obtained from incandescent lamps vary greatly with the degree of thoroughness of the mixture, with the relative proportion of the gas and air, and with the velocity of delivery beneath the burner. I have found that under normal conditions I may obtain with a well-arranged apparatus one carcel with ten liters of gas, or, in round numbers, one-candle power with one liter of gas, while with ordinary burners nearly thirteen liters are required for one-candle power. A better result even may be obtained either by slightly forcing the speed of the mixing devices or by enriching either the gas itself or by artificially increasing its pressure.

By a previous invention set forth in United States Letters Patent No. 555,307, dated February 25, 1896, I have effected the intimate preadmixture of gas and air by means of a mixing device driven by extraneous power, such as a small electromotor. My present invention accomplishes the same result by utilizing the otherwise waste energy of the burner itself. To this end I introduce a motor device or fan to be driven by the ascending stream of heated gases above the burner, and I employ the power thereof to drive the mixer by which the gas and air are commingled beneath the burner. I have discovered that there is sufficient otherwise unutilized energy in these waste gases to operate the mixer as efficiently as when driven by an electromotor or other extraneous source of power. I have also found that this utilization of the otherwise waste energy of the escaping gases has the advantage that it is unaccompanied by any such jarring as was incidental to the employment of an electromotor, so that by the absence of this jarring the life of the incandescent mantle is increased.

The nature of my invention will best be understood when described in connection with the accompanying drawings, in which—

Figure 2:
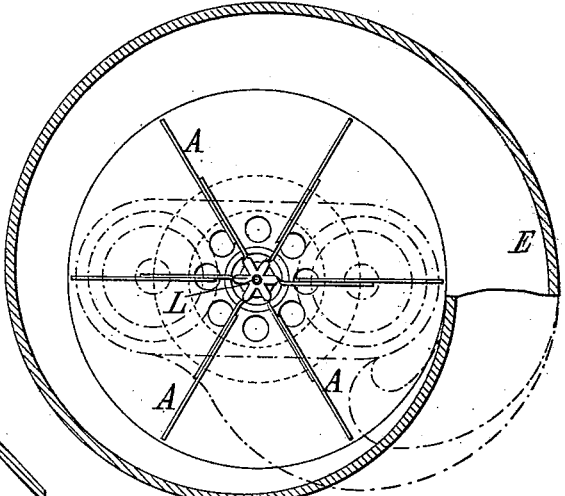
Figure 3:
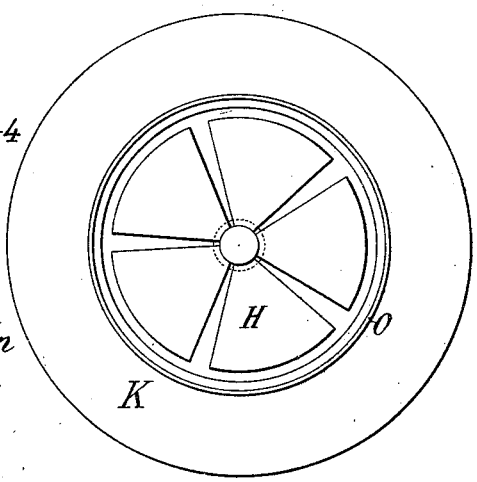
Figure 4:
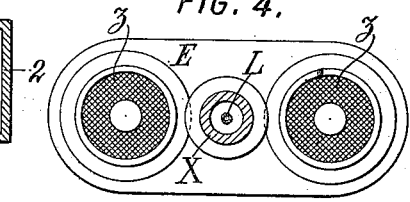
Figure 5:
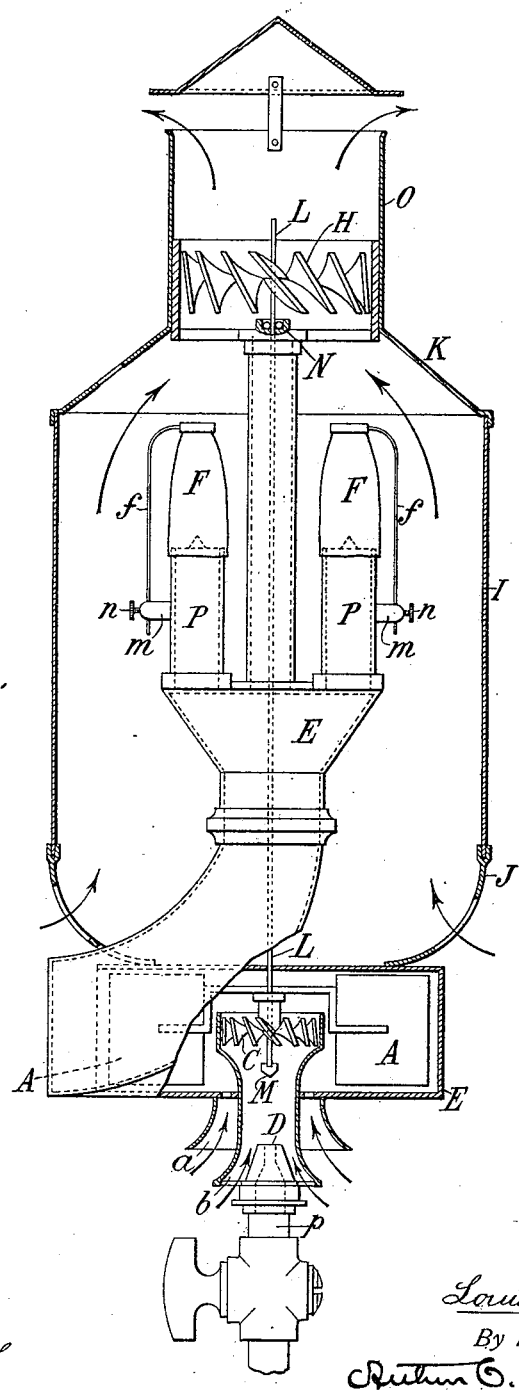

Figure 1 represents a vertical section of a two-burner lamp embodying my invention. Fig. 2 is a horizontal section on the line 2 2, Fig. 1. Fig. 3 is a top view. Fig. 4 is a horizontal section on the line 4 4, Fig. 1. Fig. 5 is a vertical section of a modified form for the apparatus.

Similar letters of reference designate corresponding parts throughout the several views of the drawings.

Referring now to Figs. 1 to 4 of the drawings, the letter E designates a casing supporting the burners P and the mantles F F and forming in its lower part a mixing-chamber in which turns a suction and mixing wheel A, mounted at the lower end of a vertical shaft L. In the present instance I have shown the blades made straight and arranged radially disposed. They may, however, be curved or placed at an angle. The shaft rests in a step M, preferably provided with a jewel, and extends upwardly beyond the tops of the mantles, passing through a tube S and being guided by a suitable ball-bearing N. The upper part of the casing E is suitably formed to receive and support the two burners P, the tops of which are covered with a suitable gauze *z*. The burners are provided with lugs *m*, through which the supporting-rods *f* of the mantles F are passed and adjustably secured by set-screws *n*.

D is the gas-nozzle, attached to the gas-pipe *p* and surrounded by air-channels *a* and *b*, as in a Bunsen burner.

K is a hood composed of an upper cylindrical part and a lower conical part, which latter part extends beneath the top of the mantles F. The hood is properly supported from the casing E or directly from the tube X. The products of combustion passing from the mantles are discharged into the conical part K of the hood and are led away through a suitable chimney O, which is made short and as wide as possible. To the upper end of the shaft L is secured a motor-wheel H, which is located within the cylindrical part of the hood K and is actuated by the draft of the chimney.

The gas-supply is regulated in the usual way by means of a cock.

It will be readily understood that the internal potential energy of the gas and of the products of combustion is used for actuating mechanical devices for the purpose of mixing gas and air without using any external force. Although the efficiency of such operating means is but small, the desired object can be accomplished by simple, crude, and inexpensive means.

In the modification shown in Fig. 5 I have made use of a small motor-wheel C, mounted on a shaft L, said wheel being an additional mechanical means for actuating said shaft L by the force of the gas-jet whenever the pressure of the gas is sufficient and adding to the power of the mixer without using any external force in addition to the potential energy of the gas and of the products of combustion. I have also shown in Fig. 5 a glass cylinder I, supported upon a perforate socket J, resting upon the casing E, said glass cylinder supporting the hood K.

What I claim as new is—

1. The described method of burning gas which consists in admitting gas and air to a mixing-chamber, commingling them by a mechanical mixing device therein, passing the mixture to a burner, igniting it therein, and utilizing the current of hot gases flowing therefrom to drive a motor device which in turn drives said mixing device, whereby the potential energy of the gas is utilized for effecting the intimate preadmixture of the gas and air to the effect set forth.

2. In a gas-lamp the combination of a mixing-chamber, gas and air inlets thereto, a mechanical mixer adapted to work therein, a burner receiving the mixed gas and air from said chamber, and a motor device arranged to be driven by the current of gases of combustion flowing from said burner, and connected to said mixer to drive the latter to the effect set forth.

3. In a gas-lamp the combination of a mixing-chamber, gas and air inlets thereto, a mechanical mixer adapted to work therein, a burner receiving the mixed gas and air from said chamber, a hood located above the burner, and a rotary motor mounted in said hood to be driven by the gases of combustion, and connected to said mixer to drive the latter to the effect set forth.

4. In an incandescent gas-lamp, the combination of a casing, a gas-supply nozzle to said casing, air-channels surrounding said gas-supply nozzle, a mixing-wheel located within said casing, a hood located above the burner, a motor-wheel located within said hood and adapted to be rotated by the products of combustion, and a vertical shaft connecting the mixing-wheel with the motor-wheel for causing the latter to intimately mix air and gas, substantially as described.

5. In an incandescent gas-lamp, the combination of a casing, a gas-supply nozzle connected with said casing, air-channels surrounding said gas-supply nozzle, a mixing-wheel located within said casing, a hood located above the burner, a chimney connected to said hood, a motor-wheel located within said hood and adapted to be rotated by the products of combustion, and a vertical shaft connecting the mixing-wheel with the motor-wheel for rotating the latter to cause an intimate mixture of air and gas, substantially as described.

6. In an incandescent gas-lamp, the combination of a casing, a gas-supply nozzle attached to said casing, air-channels surrounding said casing, a mixing-wheel located within said casing, one or more gas-burners supported by said casing and in communication with the interior of the same, one or more incandescent mantles surmounting the burner or burners, a motor-wheel located above the tops of the incandescent mantles and located within a hood having a cylindrical and a conical portion; said hood extending over the tops of the incandescent mantles, a shaft connecting the motor-wheel and mixing-wheel, and a chimney surmounting the hood, substantially as described.

In witness whereof I have hereunto signed my name in the presence of two subscribing witnesses.

LOUIS DENAYROUZE.

Witnesses:
 JULES ARMENGAUD, Jeune,
 PAUL CONAR.